United States Patent
Bloom

(10) Patent No.: US 9,342,855 B1
(45) Date of Patent: May 17, 2016

(54) DATING WEBSITE USING FACE MATCHING TECHNOLOGY

(71) Applicant: Christina Bloom, New York, NY (US)

(72) Inventor: Christina Bloom, New York, NY (US)

(*) Notice: Subject to any disclaimer, the term of this patent is extended or adjusted under 35 U.S.C. 154(b) by 382 days.

(21) Appl. No.: 14/064,414

(22) Filed: Oct. 28, 2013

Related U.S. Application Data

(63) Continuation-in-part of application No. 13/088,631, filed on Apr. 18, 2011, now abandoned.

(51) Int. Cl.
*G06Q 50/00* (2012.01)
*G06K 9/00* (2006.01)

(52) U.S. Cl.
CPC ............ *G06Q 50/01* (2013.01); *G06K 9/00275* (2013.01)

(58) Field of Classification Search
CPC .... G06Q 30/02; G06Q 50/01; G06F 17/3053; G06F 17/30256; G06K 9/00288; G06K 9/00677; G06K 9/00221; G06K 9/00281; G06K 9/00248; G06K 9/00268; G06K 9/0275
See application file for complete search history.

(56) References Cited

U.S. PATENT DOCUMENTS

| | | | |
|---|---|---|---|
| 7,684,651 B2 | 3/2010 | Tang et al. | |
| 2005/0043897 A1* | 2/2005 | Meyer | G06Q 30/02 702/19 |
| 2005/0083413 A1 | 4/2005 | Reed et al. | |
| 2006/0018522 A1 | 1/2006 | Sunzeri et al. | |
| 2007/0172155 A1 | 7/2007 | Guckenberger | |
| 2008/0162568 A1 | 7/2008 | Shen | |
| 2008/0201327 A1 | 8/2008 | Seth | |
| 2008/0270425 A1 | 10/2008 | Cotgreave | |
| 2009/0271387 A1 | 10/2009 | Lee | |
| 2009/0299961 A1 | 12/2009 | Lo | |
| 2010/0135584 A1 | 6/2010 | Tang et al. | |

OTHER PUBLICATIONS

Takacs, Barnabas, "Comparing Face Images Using the Modified Hausdorff Distance", 1998, Pattern Recognition, vol. 31, No. 12, pp. 1873-1881.*
Achermann, et al, "Classifying range images of human faces with Hausdorff distance", 2000, Pattern Recognition, vol. 2, pp. 809-813.*
Verlin B. Hinsz Facial Resemblance in Engaged and Married Couples Journal of Social and Personal Relationships North Dakota State University May 1989.
Evolutionary Psychology Narcissism Guides Mate Selection human-nature.com/ep—2004. 2: 177-194.

(Continued)

*Primary Examiner* — Edward Park
(74) *Attorney, Agent, or Firm* — Goldstein Law Offices, P.C.

(57) ABSTRACT

A system having a dating website using facial images technology to match a first user to a second user having similar facial features and electronically introducing the users for establishing a dating relationship. The website further selects matches to the first user among the matches bearing a facial resemblance to the user based on complementary styles, values and compatible personalities. The website is accessed directly, through social networking sites or through mobile applications on smart phones and other handheld computing devices. The mobile application notifies the website where the user is and informs the user if any matching users are nearby or in the same location. If no matches are available in the location, the user photographs new acquaintances using the handheld computing device and uploads the photos to determine if the new acquaintances bear a facial resemblance to the user.

6 Claims, 22 Drawing Sheets

(56) References Cited

OTHER PUBLICATIONS

Anthony C. Little, et al. Assortative Mating for Perceived Facial Personality Traits Personality and Individual Differences 40 (2006) 973-984.

Pamela Paul The New York Times For Long Term, Men Favor Face Over Figure Nov. 5, 2010.

Lisa M. Debruine Facial Resemblance Increases the Attractiveness of Same-Sex Faces More Than Other-Sex Faces McMaster University Seven Pages.

The Effect of Similar Physical Features on Perceived Levels of Attraction Clemson University—Psychology Eight Pages.

Nancy Kanwisher and Galit Yovel Face Perception Feb. 25, 2009 Eighteen Pages.

\* cited by examiner

DATING WEBSITE USING FACE MATCHING TECHNOLOGY

CROSS-REFERENCE TO RELATED APPLICATIONS

This application is a continuation-in-part of the nonprovisional utility application, Ser. No. 13/088,631 filed in the United States Patent Office on Apr. 18, 2011, which is expressly incorporated herein by reference in its entirety and claims the priority of the provisional patent application, Ser. No. 61/431,261 filed in the United States Patent Office on Jan. 10, 2011 thereof and is expressly incorporated herein by reference in its entirety.

TECHNICAL FIELD

The present disclosure relates generally to a dating website using face matching technology. More particularly, the present disclosure relates to system having a dating website using face matching technology that matches a first user to a second user having similar facial features to electronically introduce the users for establishing a dating relationship.

BACKGROUND

Passion is often ignited when we spot someone whose features are similar to our own. The visual portion of the brain signals our unconscious and we are innately drawn to people with features like ours. In earlier times, people relied on introductions by friends and relatives, who perhaps subconsciously recognized facial similarities between people and decided to initiate matchmaking. Familiarity creates an instant bond when people meet for the first time.

In the twenty-first century, with unprecedented mobility, people no longer can rely on friends and relatives for introductions because they are not nearby. Just as for many other searches, people have turned to the internet to find potential dates. Online dating is one of the earliest applications developed for the Web. Online dating is third in the internet's paid content category, behind online gaming and music, with approximately a billion dollar business annually in the United States alone. As many as one in five singles date someone they met on line, with many marrying as a result.

Currently there are over 1,000 online dating sites, with the top 5 sites controlling eighty percent of the market. None are perceived as "having the answer" and it is suggested that there is a high level of dissatisfaction with existing dating site. Despite this level of frustration by users, forty-four percent of Americans believe they have a better chance meeting a partner online than in a bar or club.

Face matching software is well known in the art, generally relying on a user selecting specific facial features for matching or by ranking the results by which features match the queried face. Others have developed a matching service based on matching faces with an idealized facial profile determined by the user or matching to a celebrity in order to purchase accessories and fashions worn by the celebrity to enhance the visual similarity. Using this matching service, others have proposed a social networking website for linking people based on their faceprint.

Others use visual data such as a photo to allow a user to sort through known contacts and determine the nature of the relationship with the contact based on the photos and metadata associated with the photos. The system does not rely on facial features to quantify the relationship but other factors in the photo. The system does not help the user to establish a new contact but only sorts through the user's known online associates.

None of the websites and services combines matching facial features with sorting the matches based on additional biographical data that characterize a user's style, values and personality. None of services associate facial features of members that are simply familiar without exactly conforming with each other.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a dating website that is based on the science of attraction. Accordingly, the present disclosure provides a dating website that matches a user with another user based on the scientific principals of attraction between people bearing a facial resemblance to each other.

Another aspect of an example embodiment in the present disclosure is to provide a dating website that is based on the art of attraction. Accordingly, the present disclosure provides a dating website that matches a user to others bearing a facial resemblance to the user, and further matches a user based on complementary styles, values and compatible personalities among those who bear a facial resemblance.

Yet another aspect of an example embodiment in the present disclosure is to provide a dating website that allows a user to determine if a match bearing a facial resemblance and having complementary styles, values and compatible personalities to the user is in the same location as the user. Accordingly, the present disclosure provides a dating website that has a mobile application for a mobile computing device such as a smart phone that transmits the location of the user to the system and the system notifies the user via the mobile application if a match is in the same location.

A further aspect of an example embodiment in the present disclosure is to provide a dating website that allows a user to determine if a new acquaintance bears a facial resemblance to the user. Accordingly, the present disclosure provides a dating website that allows a user to photograph a new acquaintance using a mobile computing device such as a smart phone and upload the photo to the database of the system for analysis to determine if the new acquaintance bears a resemblance to the user.

Yet a further aspect of an example embodiment in the present disclosure is to provide a dating website that targets Fusiform Gyrus in a temporal lobe of the brain of a first user when introducing a second user with a response of familiarity. Accordingly, the present disclosure provides a dating website that creates a simple map of each face in a database, using the general shape of a user's face and feature placement, finding a facial image of second user that will be familiar to a first user, stimulating Fusiform Gyrus in the first user's brain.

Accordingly, the present disclosure describes a system having a dating website using face matching technology to match a first user to a second user having similar facial features and electronically introducing the users for establishing a dating relationship. Similarity is based on creating a simple map of the face, emphasizing overall shape of the face and feature placement. The website further selects matches to the first user among the matches bearing a facial similarity to the user based on complementary styles, values and compatible personalities. The website is accessed directly, through social networking sites or through mobile applications on smart phones and other handheld computing devices. The mobile application notifies the system where the user is and informs the user if any matching users are nearby or in the same location. If no matches are available in the location, the user photographs new acquaintances using the handheld computing device and uploads the photos to determine if the new acquaintances bear a facial resemblance to the user.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
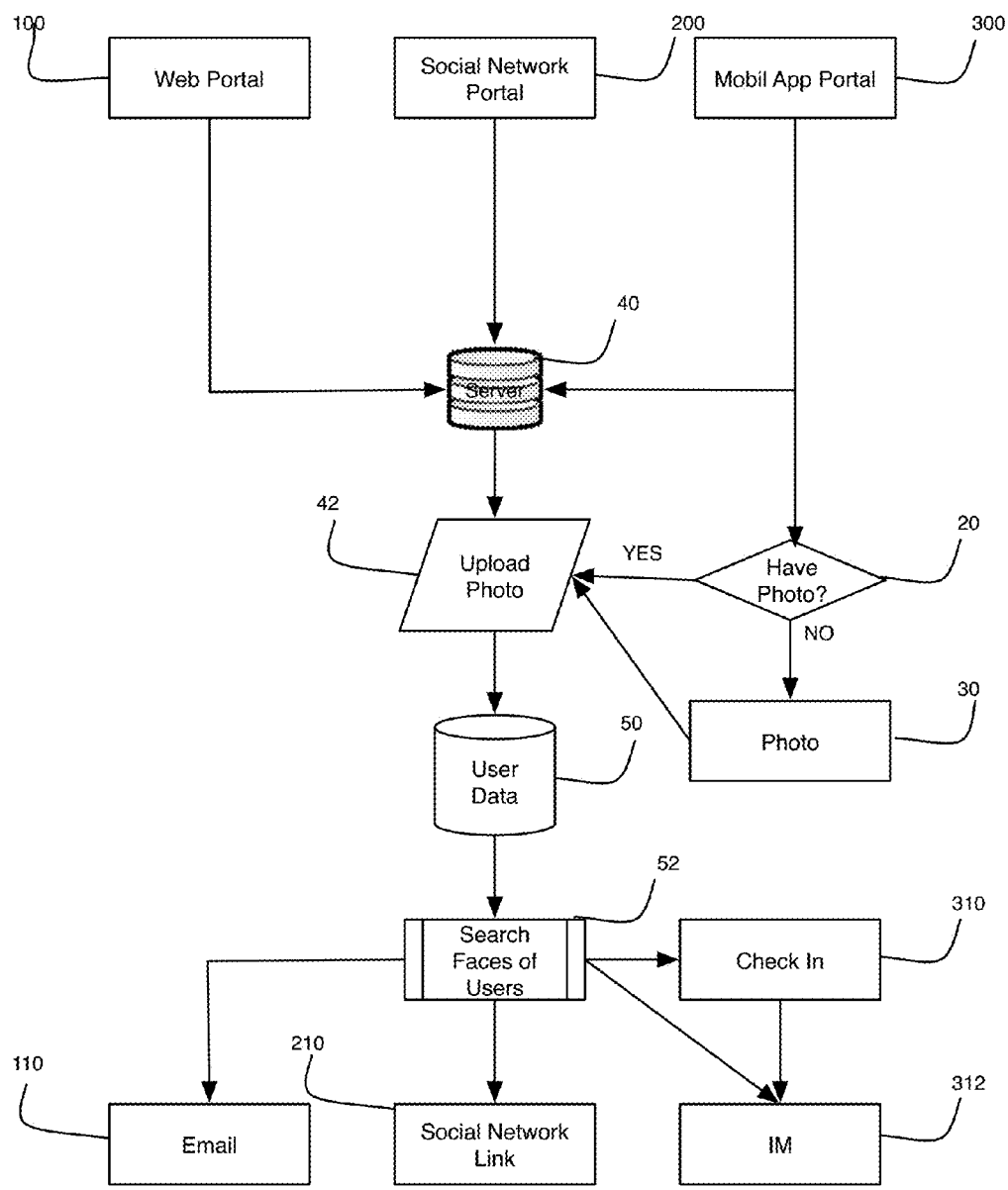
FIG. 1 is a block diagram, illustrating a workflow of an example embodiment of the present disclosure.

FIG. 1 illustrates a block diagram showing an overview of a workflow of the an example embodiment of the present disclosure. The example embodiment is a system having a dating website using face matching technology that matches a first user to a second user having similar facial features and electronically introducing the users for establishing a dating relationship. The system further selects matches to the first user among the matches bearing a facial resemblance to the user based on complementary styles, values and compatible personalities. A database and software applications of the system reside on a server and are executed by a processor on the server.

The user enters the system and starts 10. The system is accessed through a portal such as the website 100 directly, through a social networking site 200 or through a mobile applications 300 on a smart phone or other handheld computing devices. The mobile application 300 notifies the website where the user is when the user checks in 310 and informs the user if any matching users are nearby or in the same location.

The block diagram demonstrates the plurality of methods to access the website on a website server 40, and to register and upload photos and user data in a system having a database 50 of user data, including photos. The block diagram also illustrates the plurality of methods to contact a match once a user uploads a photo and the system determines a plurality of matches based on facial resemblance to the user photo.

The user, desiring to use facial resemblance to search for a match to establish a dating relationship, accesses the website through the web portal 100 directly on the website, through the social network link portal 200, such as for, example, but not limited to, Facebook® (Facebook® is the registered trademark of Facebook, Inc., Palo Alto, Calif.) MySpace® (MySpace® is the registered trademark of MySpace, Inc., Beverly Hill, Calif.) or through a mobile application portal 300 downloaded onto a handheld computing device such as a smart phone or portable digital assistant (PDA). When the user connects to the server 40 directly, the user registers basic identifying data 42 to establish an account and uploads a photo showing the user's face. The basic data includes for example, but is not limited to age and gender. The user selects basic data preferences for matching such as, for example, but is not limited to, age range and gender. If the user connects through the social network portal 200, the user has the option of using a photograph already on the user's social network account or to upload a different photo. If the user connects through the mobile application portal 300, the user determines if there is a photo available 20 to upload from the device or takes a new photo to upload directly, using the device. After uploading the photo and basic identifying data as well as basic data preferences, the system searches 52 the database, comparing the user's face with the faces of other users stored in the database, finding at least one second user who bears a facial resemblance to the user and whose basic data matches the first user's basic data preferences. The face matching technology selects the second user based on a calculated minimum similarity factor based on analysis of facial features. The system further limits selection to the second user having at least the minimum similarity factor and whose basic data match the basic data preferences of the first user and whose basic data preferences match the basic data of the first user. The system provides the matching second user to the first user. If the first user is a registered member, the system provides a plurality of methods of linking to the matches. The user links to the matches through the social network by inviting the match to "friend" or link 210 to the user's social network account, "pokes" through the social network or through email 110 or through an instant message 312 to a smart phone. If the user is accessing the system through the mobile application, the user has the option to check-in 310 to the website by transmitting the user's location to the website. The system determines if any matches are in the same location so that the user can directly instant message 312 a local match and meet face to face if so desired.

Figure 6A:
FIG. 6A is an initial home page for the website.

FIG. 2 illustrates a further example embodiment, where the user initially searches for matches with similar facial features and becomes a member and chooses to find matches based on complementary styles, values and compatible personalities among the matches who bear a facial resemblance to the user. The user begins the process 12 by entering the website through the social network portal 200 or the web portal 100. The website displays 110 the scientific principles of attraction based on facial resemblances. The website further explains the art of attraction based on complementary styles, values and compatible personalities. FIG. 6A shows a display of the example embodiment in a website home page. Those of ordinary skill in the art will understand that the illustrative displays such as FIG. 6A and other drawings are to be interpreted in an exemplary manner and that displays different from those shown and described herein can be used within the scope of the present disclosure. For example, features of the displays can be combined, separated, interchanged, and/or rearranged to generate other displays.

Figure 2A:
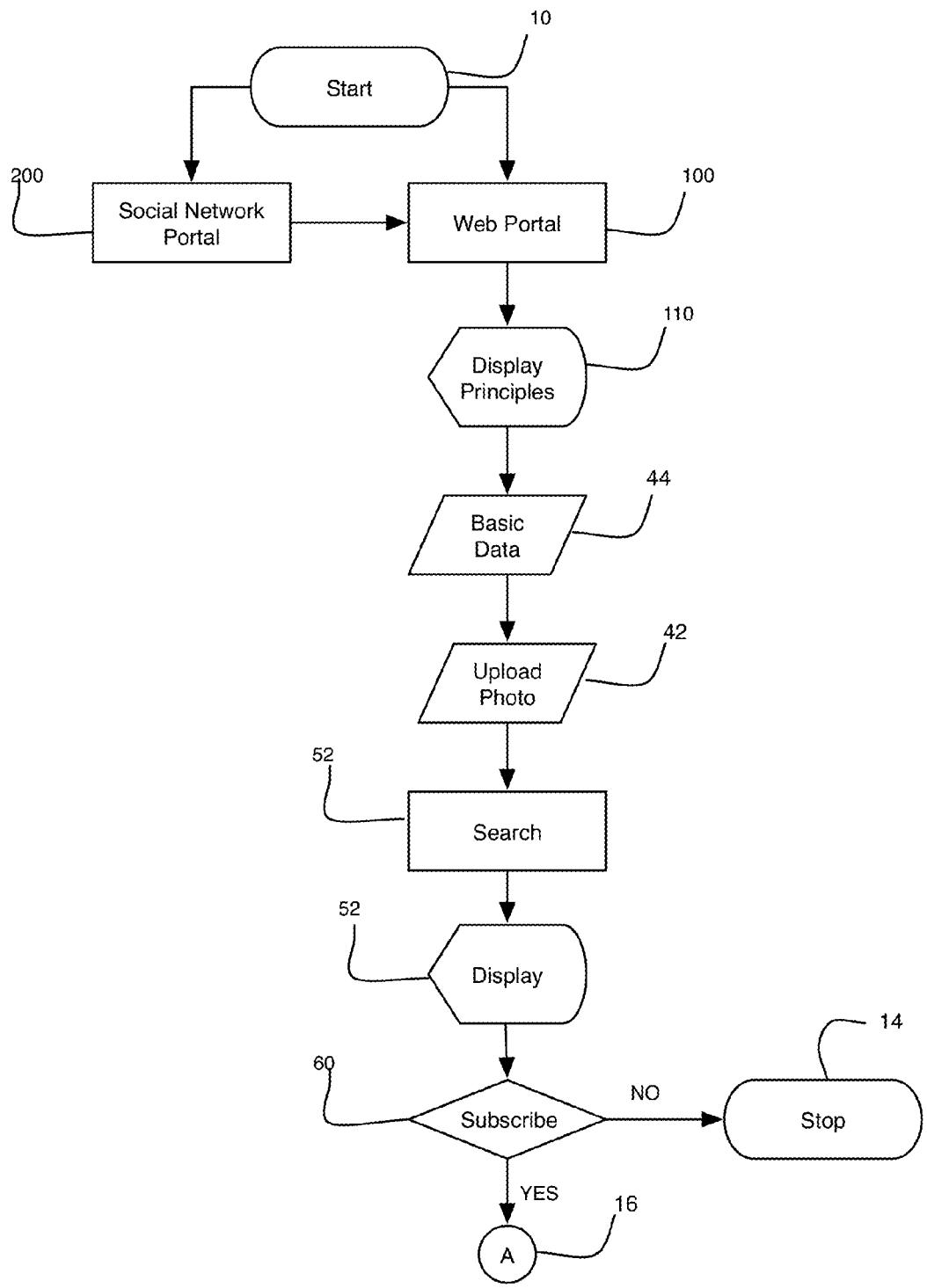
FIG. 2A is a block diagram, illustrating a non-member engaging with a website.
Figure 4:
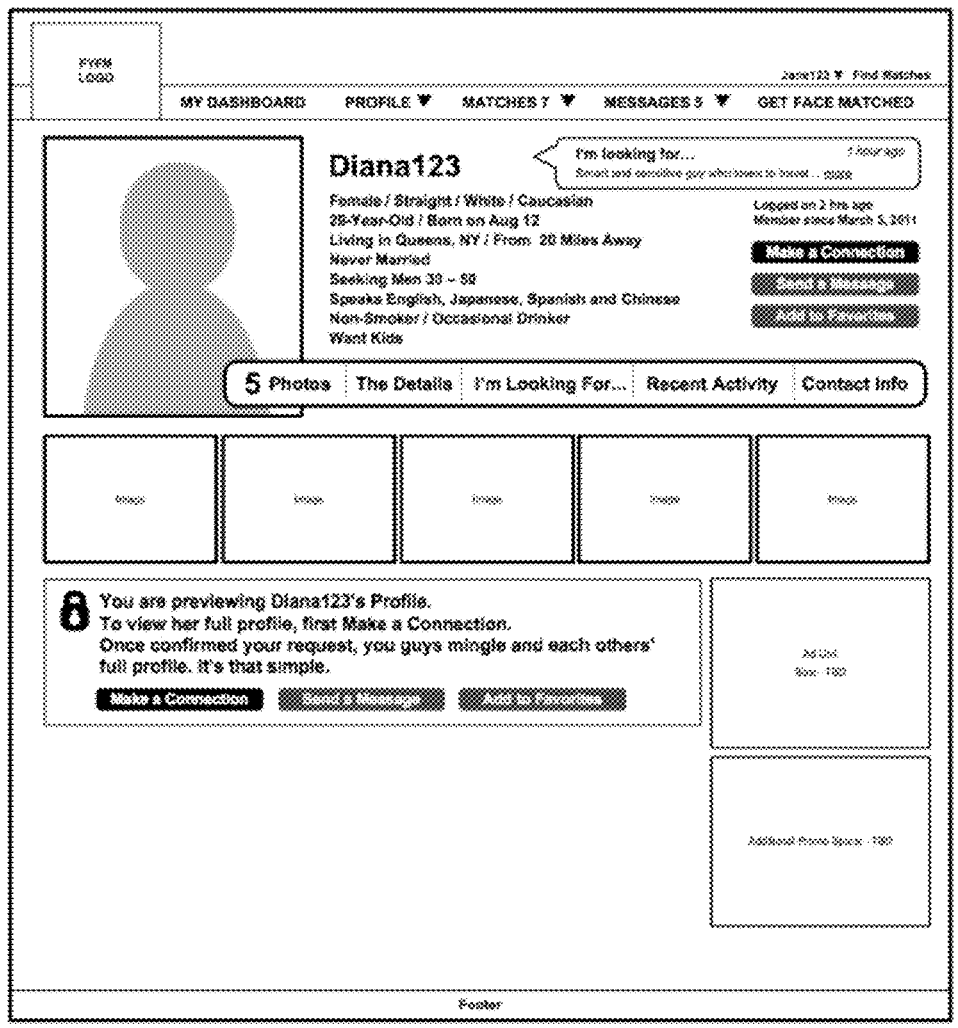
FIG. 4 is a display of a restricted profile of a member on the website.
Figure 6B:
FIG. 6B is a preparatory data entry page for initially engaging a non-member with the website.
Figure 6C:
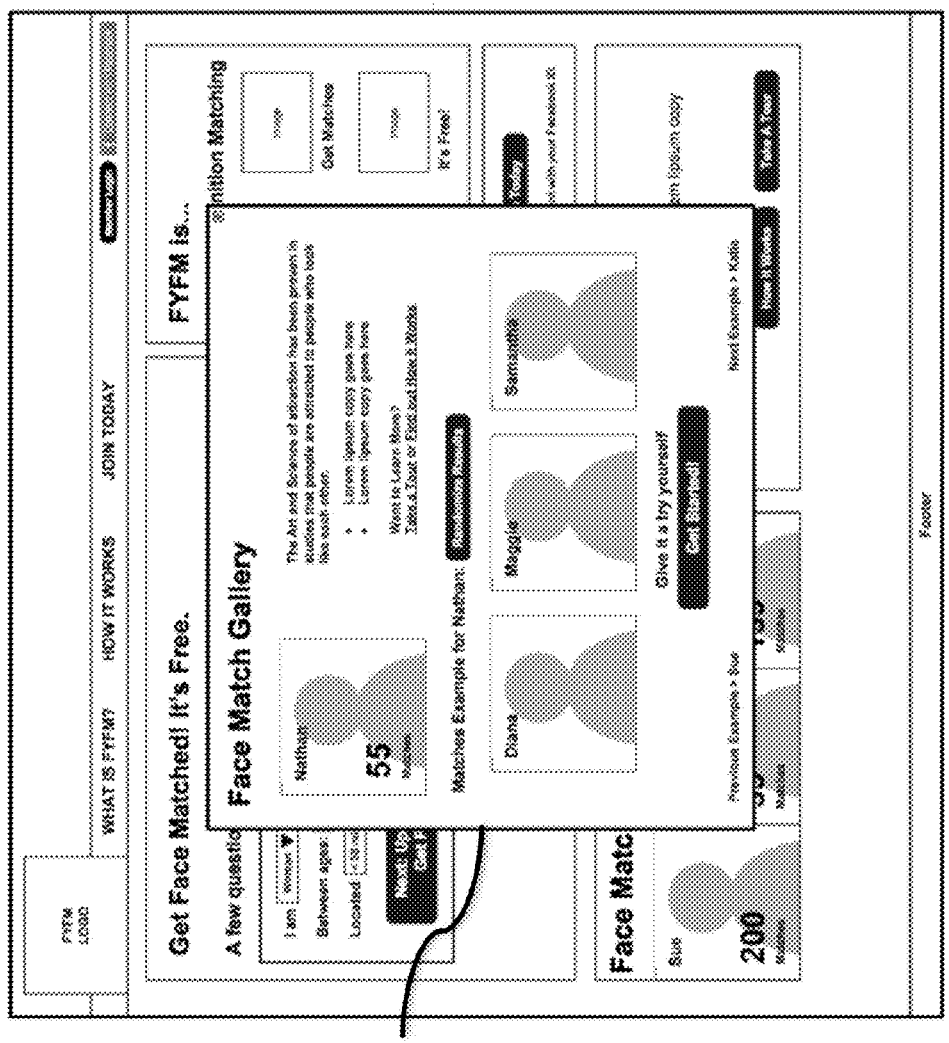
FIG. 6C is a display of a plurality of matches to a non-member on the website.

The non-member user can choose to find facial matches by selecting the button marked "Get Started" 112. As displayed in FIG. 6B, the system displays a plurality of input box elements 114, such as text input boxes and drop down selection boxes for basic data such as gender, gender sought, age, location. Referring to FIG. 2A, the user registers with basic identifying data and preferences, uploads the photo 42, the system searches the database 52 for other users with similar facial features 56 and presents the matches 116 as described without identifying information, as shown in FIG. 6C. The user can select a photo and the system displays an abbreviated profile, as shown in FIG. 4 without contact information. As shown in FIG. 2A, the user is presented with the option of subscribing 60 to a further search using complementary styles, values and compatible personalities and to be able to initiate contact with any matches initially found. If the user does not desire to join, the user leaves the website 14.

Figure 6D:
FIG. 6D is a home page of a new member or a member without new activity on the website.
Figure 7A:
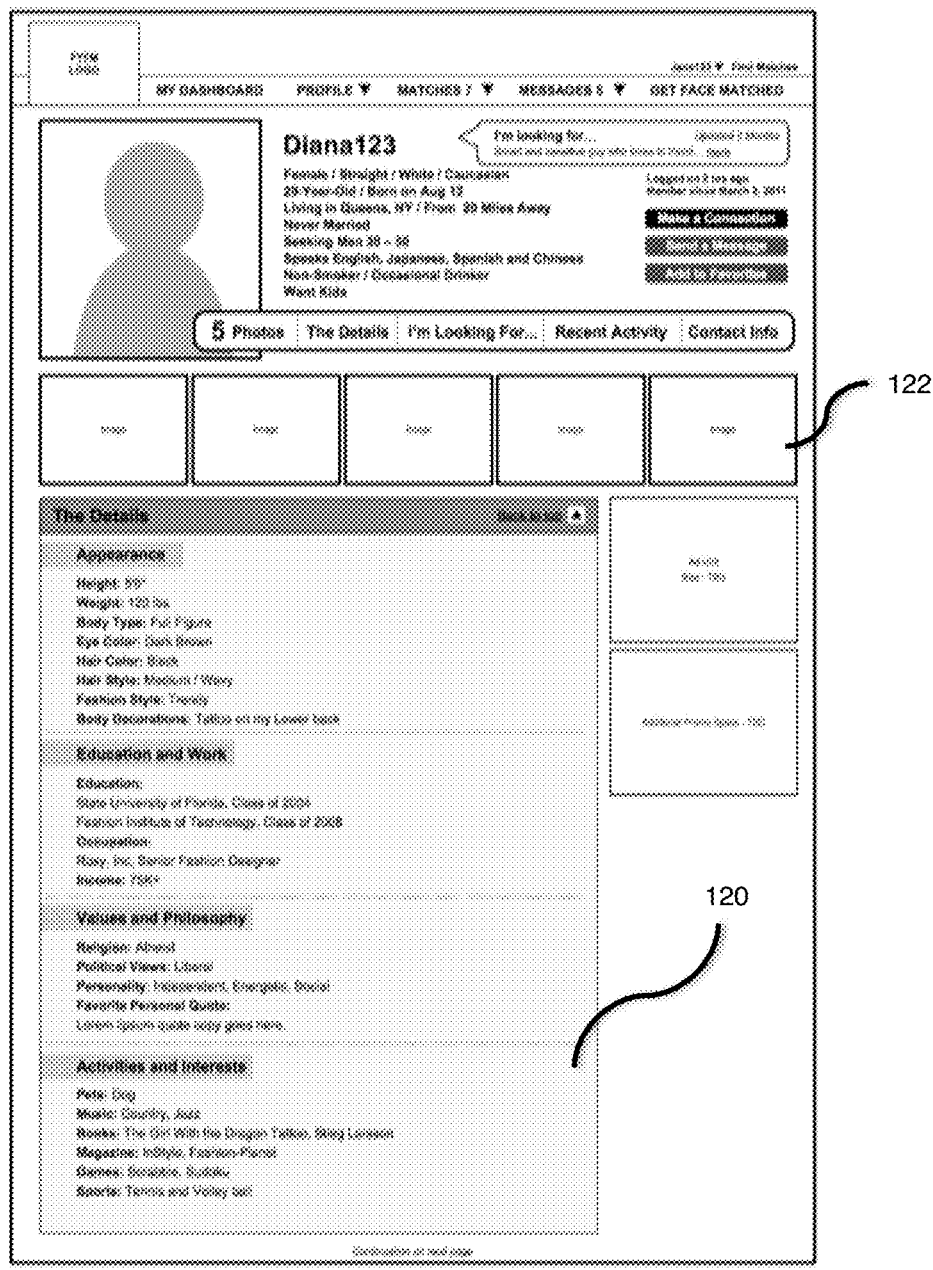
FIG. 7A is a display of a member profile on the website.
Figure 7B:
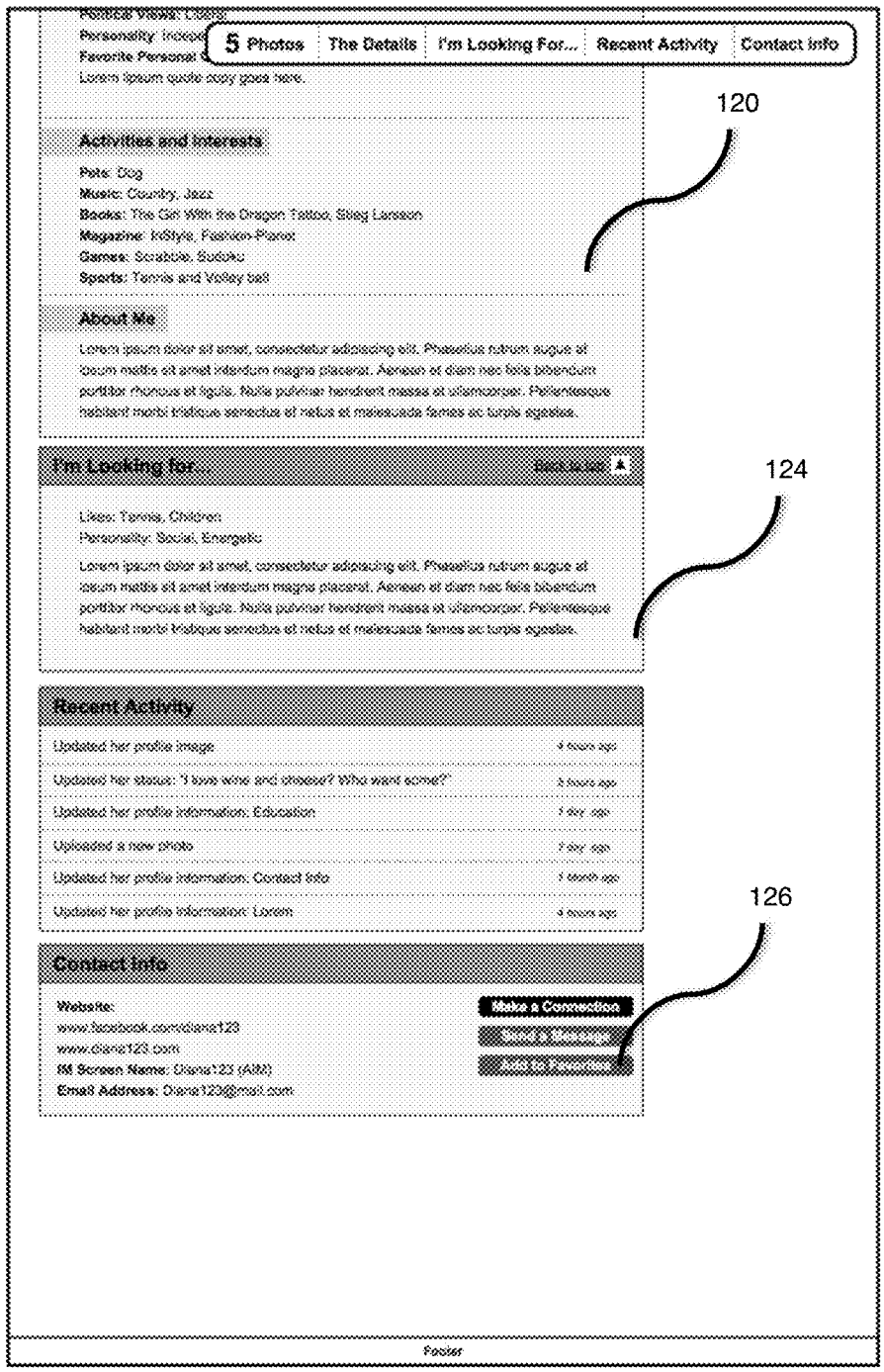
FIG. 7B is a continuation of the display of the member profile.

As displayed in FIG. 6D, if the user subscribes, the user is presented a header 130 with identifying information 132 as well as a plurality of functions 134. The user begins the new member registration process 34 illustrated in FIG. 2B. The user enters advanced biographical information 36 that includes information on style, value and personality. FIG. 7A and FIG. 7B show an exemplary listing 120 of the information the user enters such as, for example, but not limited to, physical characteristics, education, career, values and philosophy, activities and interests, as well as a short personal statement. The user has the option of uploading additional photos or using the photo loaded initially or replacing the photo 122. As displayed in FIG. 7B, the user also enters information about what the user is seeking in a match 124 as well as contact information 126.

Figure 2B:
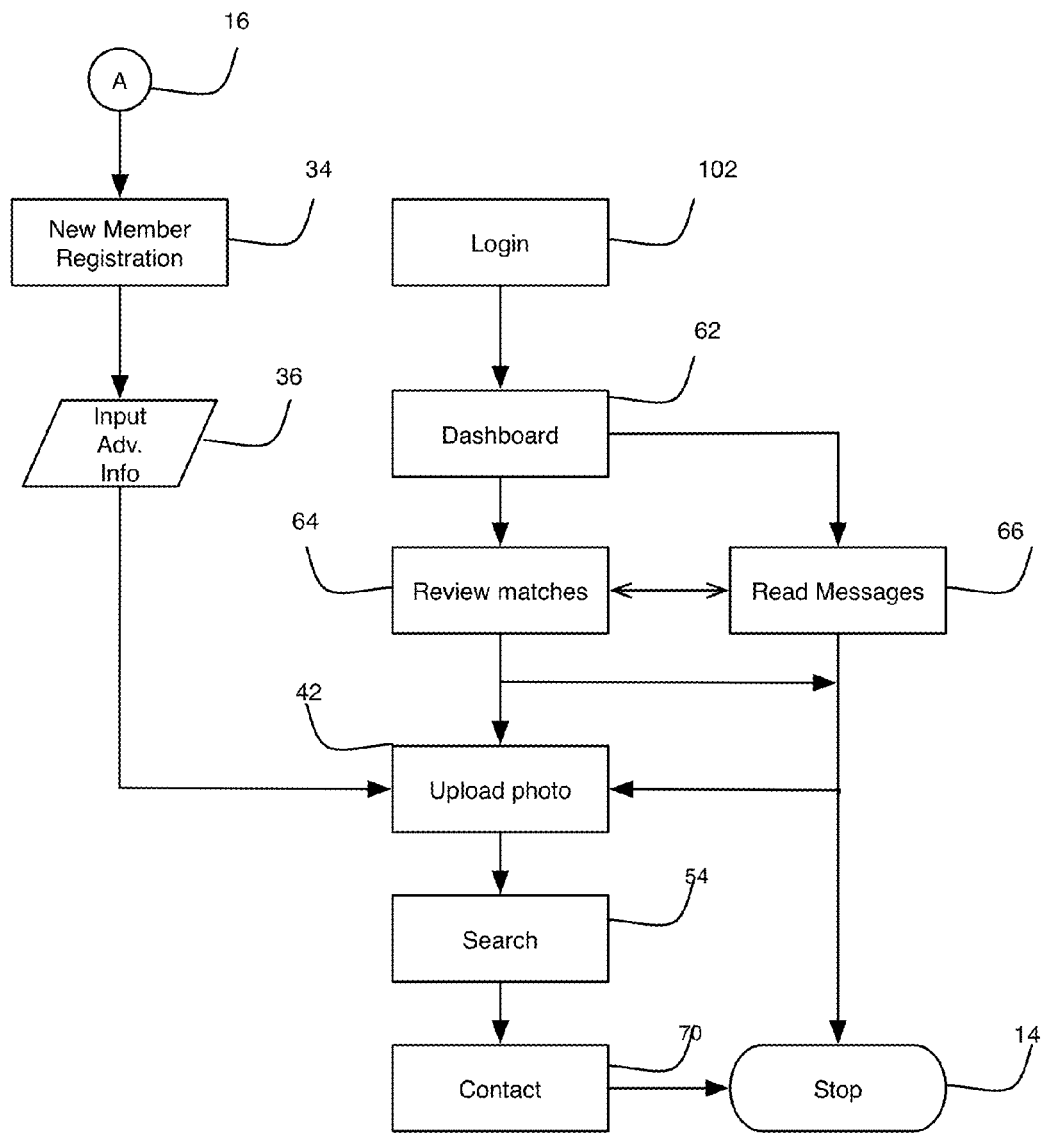
FIG. 2B is a block diagram, continuing from FIG. 2A, continuing with a new member registration or an existing member engaging with the website.
Figure 9A:
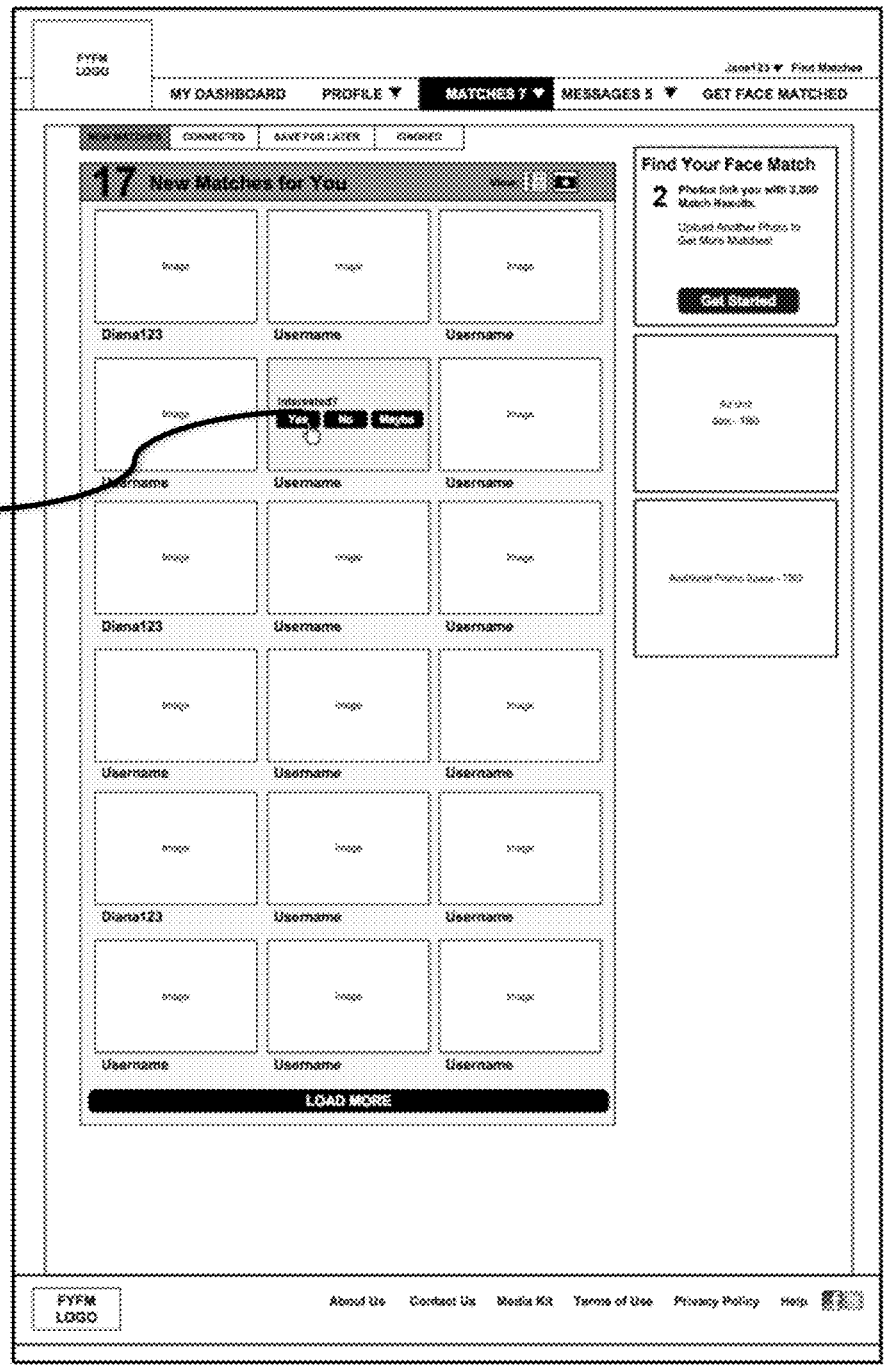
FIG. 9A is a display of plurality of photos of matches for the member selected from a database of the system, presented on the website.
Figure 9B:
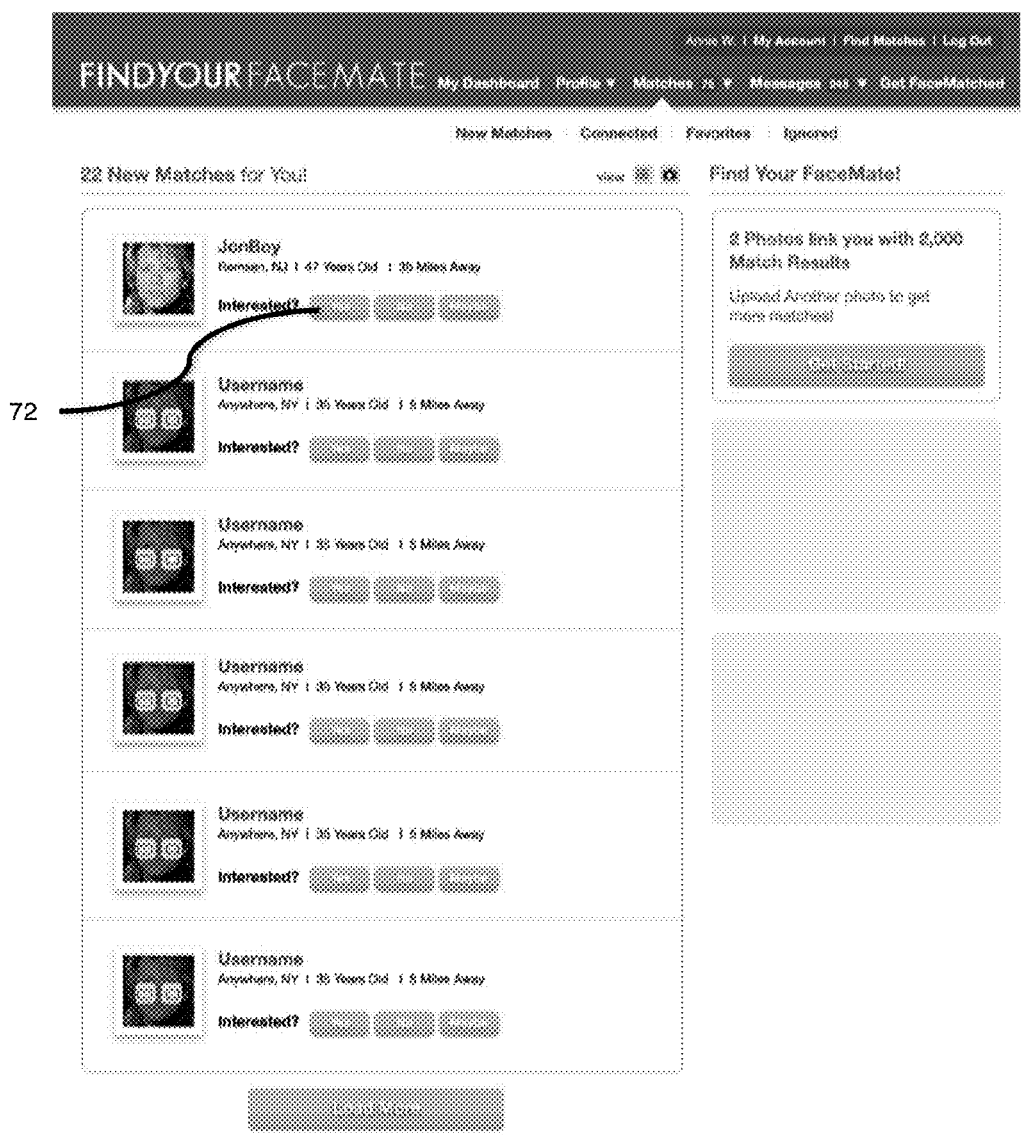
FIG. 9B is an alternate display of matches, showing a small amount of information about the matches for the member, presented on the website.

Referring to FIG. 2B, the user can upload a new photo for matching purposes 52, the system searches 54 through the matches already identified 56 or finds new matches by comparing photos in the database with the additional photos uploaded in the registration process as having similar facial features to the user to find matches based on complementary styles, values and compatible personalities, which are more likely to be a better dating match than those based on biographical information alone, as used by other systems. The system presents a list of matches as shown in FIG. 9A as a photo array or as a list with brief information as shown in FIG. 9B. In each display the system gives the user the ability to indicate interest or no interest or undecided by choosing a check box from a plurality of check boxes 72. The system presents the methods of contact 70 as described hereinabove.

When the user returns to the website as displayed in FIG. 6A, the user can login directly or login through a social networking site. The user also has the option of linking a social network account to the system account, allowing the system to populate the user's system account with information from a profile on a social network containing the information on style, values and personality as well as sharing activity updates.

Figure 6E:
FIG. 6E is a home page of a member showing a display of new activity for the member on the website.
Figure 8:
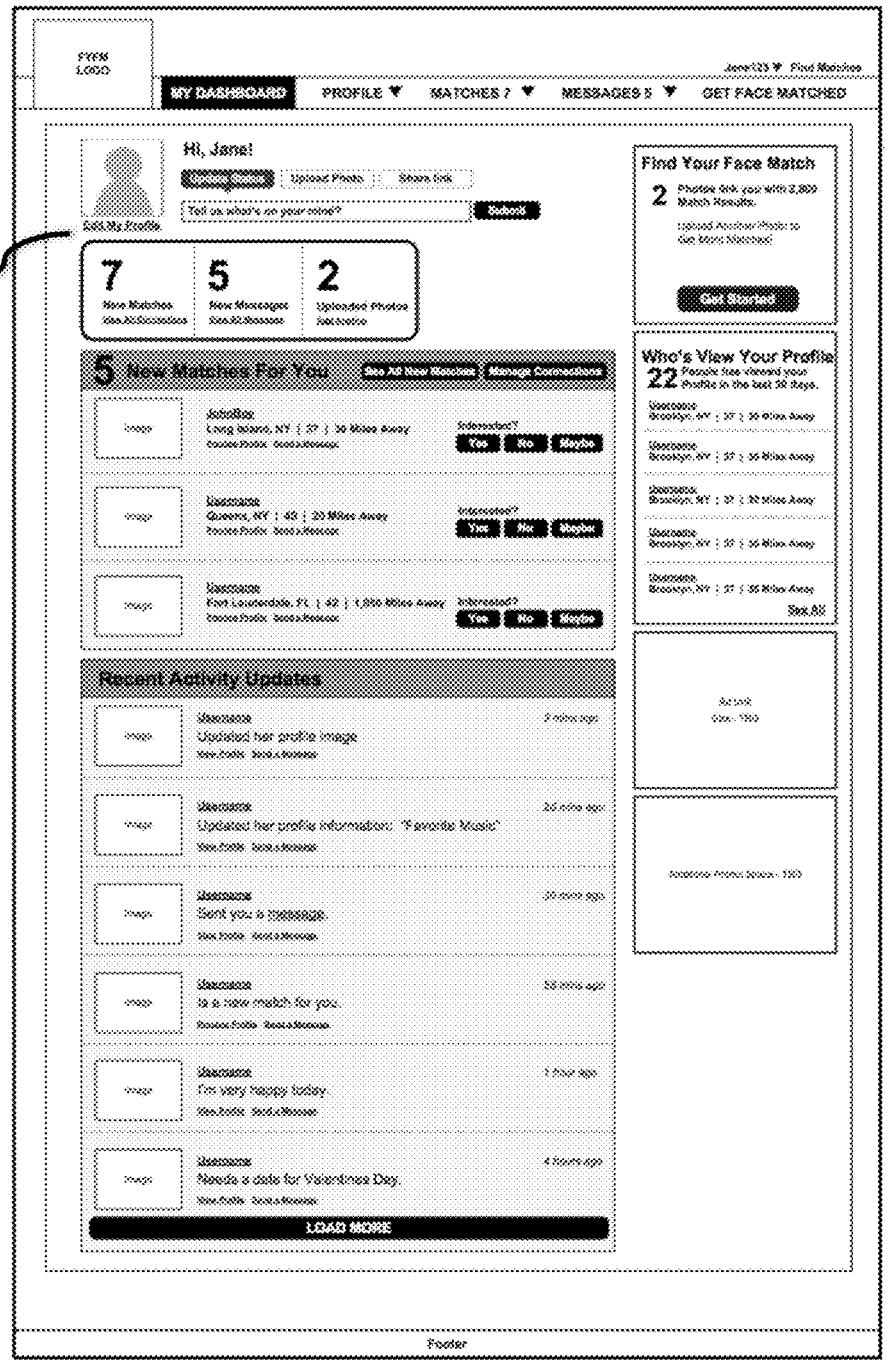
FIG. 8 is a display of a member dashboard, showing recent activity for the member on the website.
Figure 9C:
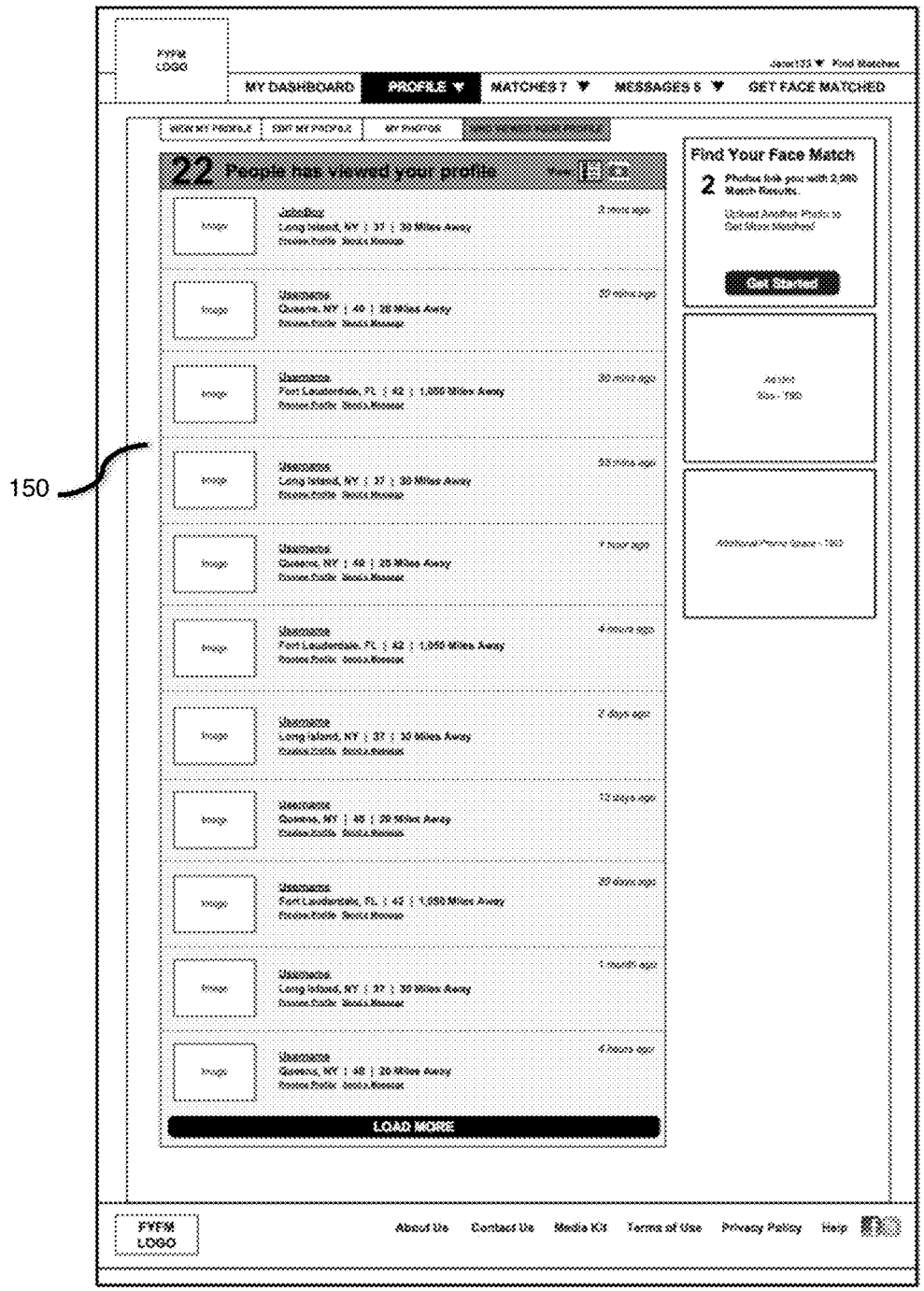
FIG. 9C is a display of a plurality of people who have viewed a member's profile as presented on the website.

Once the user has logged in, as shown in FIG. 6E, the header displays a number representing the new matches found in the system as well as a number representing the plurality of messages received for the user. The user can selectively pull down a list of new matches from the header, pull down a list of new messages, or select a dashboard pulldown option. Referring to FIG. 2B, the user logs in 102 and selects the dashboard 62, allowing the user to simultaneously review new matches 64 and read messages 66, as well as view recent activity other users linked to the user and which users have viewed the user's profile. The other users who have viewed the user's profile can be displayed as part of the dashboard or from a Profile pull down menu 150 as shown in FIG. 9C. FIG. 8 shows an exemplary display of the dashboard 62.

Referring to FIG. 2B, the user can upload a new photo for matching purposes 52, logoff 14, or request a new search 54 based on updated information or the new photo, to find better dating matches. The system presents the methods of contact 70 as described hereinabove. The user logs off the system 14 when the desired tasks are completed.

Figure 5A:
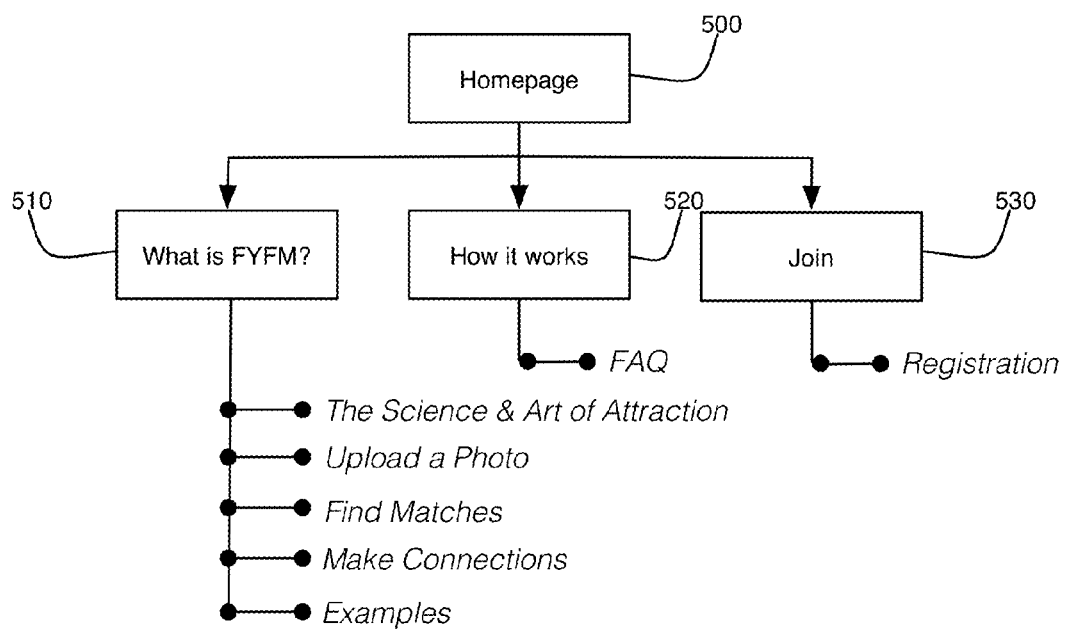
FIG. 5A is a block diagram, illustrating a site map for the website, showing an initial home page.
Figure 5B:
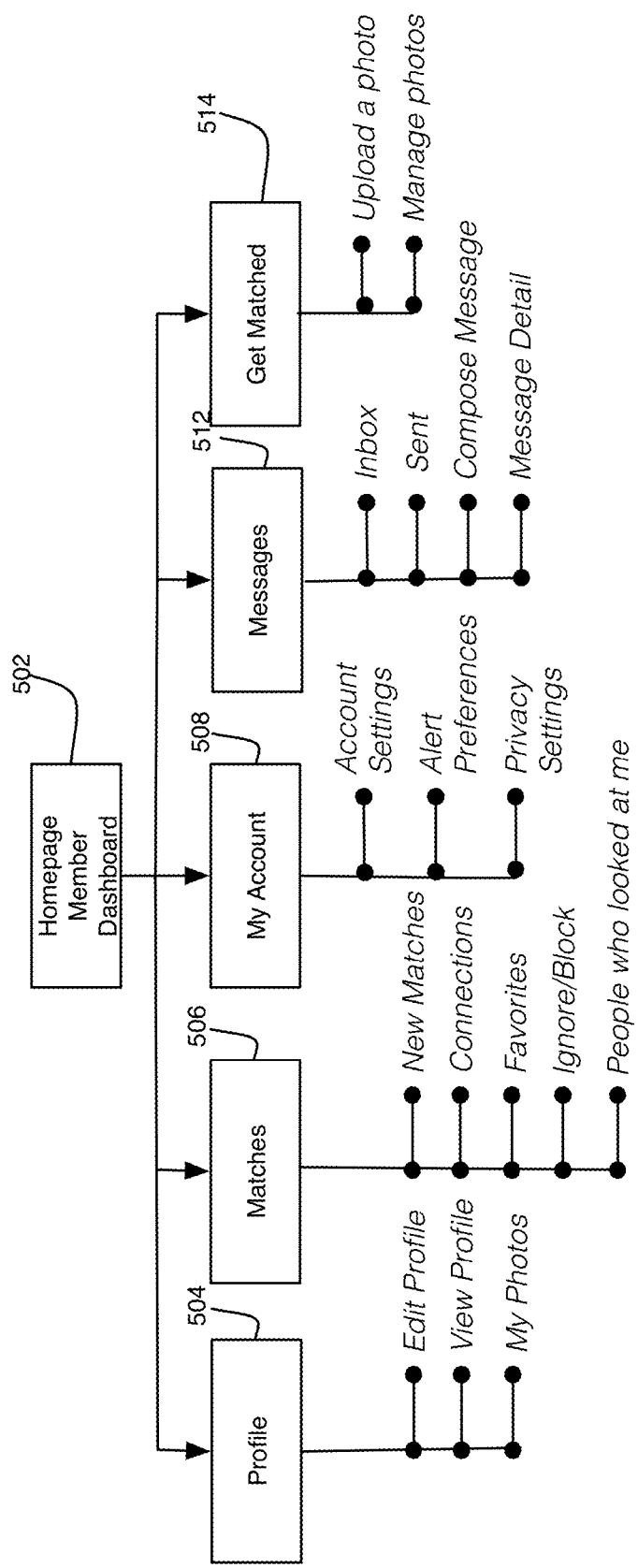
FIG. 5B is a block diagram illustrating a site map for the website, showing a member's home page.

FIG. 5A shows a site map of an exemplary website of the system, showing the initial public view. From the home page 500, the user can find out more about the system 510 of matching based on facial similarities, find out how it works 520, or join and become a member 530. From the menu to find out more about the system 510, the users selects to read about the science and art of attraction, to upload a photo, to find matches, to make connections or to see examples of compatible couples with matching facial features. If the user selects to make connections, the user is further directed to the registration process. The user selects frequently asked questions (FAQ) to explain further how the system works 520. If the user selects to join 530, the user enters the registration process.

When a member logs into the system, the member sees a homepage with a dashboard 502. The user selects to view the dashboard that displays described hereinabove in FIG. 8. The homepage 502 offers pull down menus for the profile function 504, the matching function 506, the account preferences function 508, the messaging function 512 and the photo management function 514. The profile function 504 enables the user to select from editing the user's profile, viewing the profile, and viewing the photos in the profile. The matching function 506 enables the user to select to see new matches, to see connections, to see favorites, to ignore or block connections or determine who has viewed the user's profile. The account function 508 allows the user to change the account settings, the alert preferences and the privacy settings. The messaging function 512 has an inbox, a sent or outbox, a composition function and a message detail function to select from. The photo management function 514 allows the user to upload new photos and manage the photos previously uploaded to selectively choose which photos are displayed and used for matching.

Figure 3:
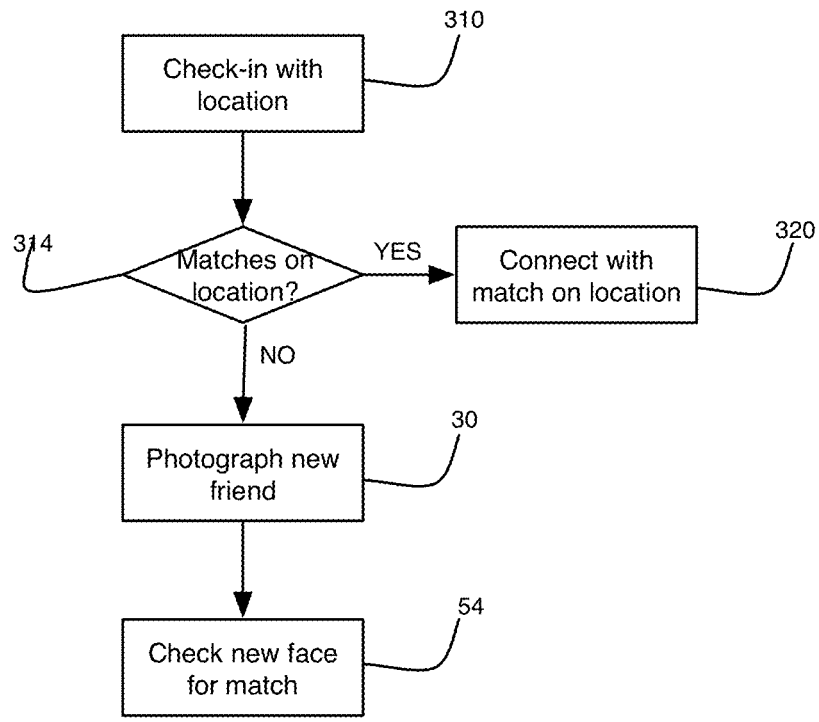
FIG. 3 is a block diagram, illustrating a workflow of a mobile application.

FIG. 3 illustrates the mobile application for use on a handheld computing device, such as a smart phone or PDA. Once the user is registered, the user then checks into the system 310, using a global positioning system (GPS) on the handheld device. The mobile application notifies the user if any of the matches identified by the system are in the location 314. If a match is in the location, the user instant messages the match, connecting with the match and letting the match know that the user is nearby so that a meeting can be arranged. If no match is in the new location, the user has the option of taking photos 30 of other people, such as a new acquaintance and uploading the photos to the system to determine if the new acquaintance is a facial match 54 for the user.

A method that the system uses for matching and introducing the first user to at least one second user for establishing a dating relationship starts with the system storing at least one photo uploaded by the first user through the data portal with the first user's basic data and preferences associated with the photo, and storing at least one photo of the second user uploaded through the data portal, with the second user's basic data and preferences associated with the photo. Using face matching technology, the system calculates a minimum similarity factor based on analyzing the photo of the users and the photo of the second user and optimally matching the facial features of the first user to the facial features of the second user based on similarity factor equal to or greater than the minimum similarity factor as explained hereinbelow. The system then compares the preferences of the first user with the basic data of the matching user and the basic data of the first user to the preferences of the matching user. For example, if the first user is a male seeking to meet a female, the system compares the basic data of the matching users, selecting only a female user seeking a male user. The system displays a selected second user through the data portal, the second user matching the facial features of the first user, the display limited to the second user whose basic data matches the preferences of the first user and whose preferences match the basic data of the first user.

If the first user joins and becomes a member, the system stores the first user's style, values and personality along with the photo and basic data and preferences as well as the second user's style, values and personality. The system then further compares the preferences of the first user with the basic data of the matching user and the basic data of the first user to the preferences of the matching user.

Figure 10:
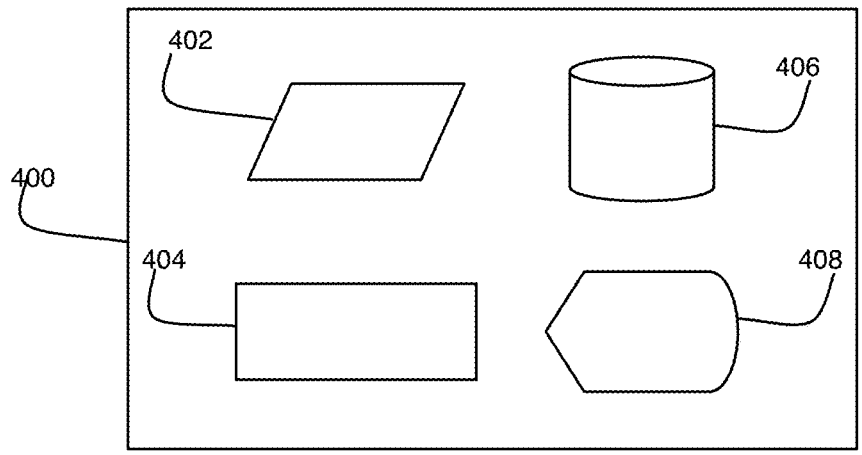
FIG. 10 is a computer system diagram of yet another example embodiment.

FIG. 10 shows a schematic diagram of a computer system that executes yet another example embodiment of the present disclosure. The system has a server 400 with a processor 404, an input portal 402 operative for receiving a plurality of profiles associated with the users and a plurality of facial images associated with said users. The system has a database 406 for storing profiles and facial images. The system has an output 408 for presenting for display the selected facial image, said image selected by the processor 402.

The method of the yet another example embodiment executed by a user desiring to use facial resemblance to search for a match to establish a dating relationship is performed on the computer system of FIG. 10. A computer-readable storage medium having a plurality of computer-readable instructions stored thereon which computer-executably implement the method described hereinbelow.

Figure 11A:
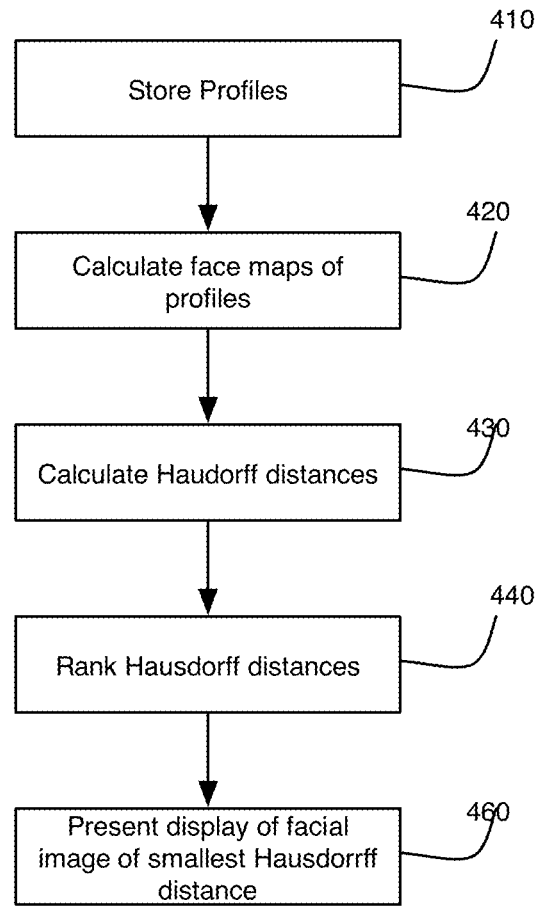
FIG. 11A is a block diagram, illustrating a workflow of yet another example embodiment.
Figure 11B:
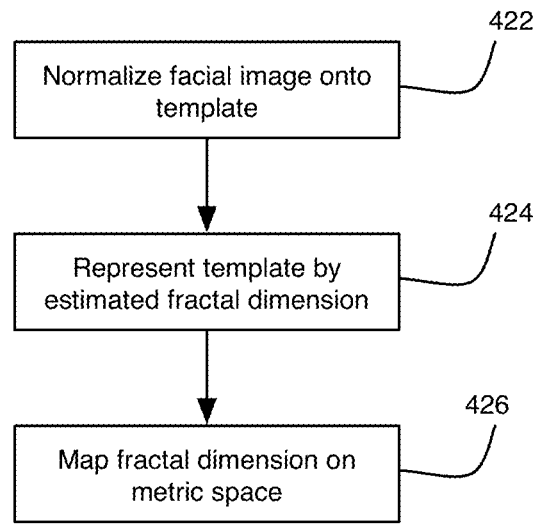
FIG. 11B is a block diagram, illustrating a subroutines of yet another example embodiment.

In FIG. 11A, the steps of the method are outlined. The steps comprise storing in a database on the server of a computer system 410, a plurality of profiles, each profile associated with a user, each profile linked to a facial image of said user, said profile and said facial image received from said user via the computer system.

A digital face map is calculated for each user 420, using the facial image linked with the profiles stored on the server. The calculations are performed by a software application executed by the processor on the server. The face map is a binary image for each facial image stored in the database. The binary image is processed by an edge detector.

The processor calculated a Hausdorff distance 430 between the digital face map of a first user and the digital face map of an other user. The processor continues the calculations until the Hausdorff distance between the digital face map of a first user and the digital face map of each other user having a profile in the database are complete and stored on the server.

The processor ranks the calculated Hausdorff distances 440, the smallest Hausdorff distance ranking highest. The processor retrieves the facial image from the database the facial image associated with the smallest Hausdorff distance.

The server presents for display 460 the facial image associated with the smallest Hausdorff distance, said facial image having a hyperlink to the associated profile, said server presenting for display the associated profile based on detecting an activation of said hyperlink by said first user, said profile stored in the server of the computer system, said first user accessing said system.

As shown in FIG. 11A, the step of calculating face maps of profiles further comprises normalizing and aligning the facial image onto a template 422, creating a set of points representing a shape of the facial image. The template is an outline of a face, said outline represented by an estimated fractal dimension 424. The fractal dimension is mapped in an underlying metric space represented by a set containing a series of coordinates 426.

The step of calculating a Hausdorff distance 440 as shown in FIG. 11A, is executed by representing the coordinates of a first set containing a series of coordinates by X and a second set represented by Y is performed with the following equation:

$$d(X,Y) = sup\{d(x,Y) | x \in X\}.$$

Figure 12:
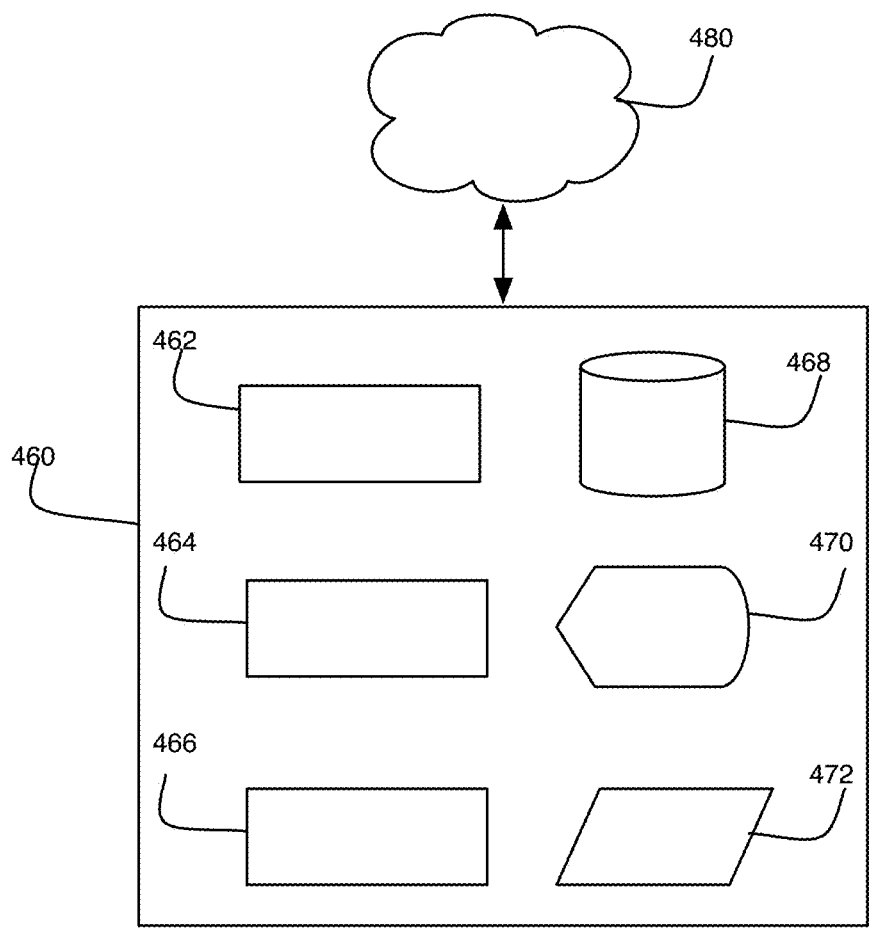
FIG. 12 is a computer system diagram of yet a further example embodiment.

Yet a further example embodiment of system operative for introducing a first user to at least one second user for establishing a dating relationship, the system presenting a second user having a face similar to the first user is illustrated in FIG. 12.

The system comprises a server 420 connecting to a computer network 480. The server stores a database 468. The database stores data for a plurality of users, including basic data for a first user and a second user, the database digitally storing at least one photo of the first user associated with the basic data of the first user, the database digitally storing at least one photo of the second user associated with basic data of the second use.

The system has a software application 462 for processing on the server 460. The server has a processor 464 for executing the software application. The software application measures the facial features of the digitally stored photo of the first user and the facial features of the digitally stored photo of the second user, said software application compares the facial features of the first user to the facial features of the second user, comparing a calculated minimum similarity factor, said minimum similarity factor calculated from five components only of the facial features of the first user and said facial features of the second user.

The system has a database management system (DBMS) 466 executed by the processor 464 on the server 460. The DBMS 466 further analyzes the preferences of the first user and compares the preferences of the first user with the basic data of the second user and the preferences of the second user to the basic data of the first user.

The system has a data portal 472 on the server for receiving at least one photo and data from the first user and a data output portal 470 for selectively presenting for display the data and the photo of the second user having facial features with a highest minimum similarity factor, the facial features stimulating a plurality of responses of recognition as determined by activity in a fusiform gyrus area of the first user's brain, The minimum similarity factor is a weighted average of the five components, said components are normalized measurements calculated as ratios. The facial features digitally measured for calculated ratios are a face width, a face height, an eye width, a chin width, a jaw width and a distance between a pair of eyes. The five components are ratios normalized against a transverse measurement, such as face height and face width.

The five normalized components are a face width to face height, an eye width to face width, a jaw width to face height, a chin width to face height and a distance between the eyes to face width.

The weighted average of the minimum similarity factor is calculated by assigning the following weights: the weight of the face width to face height is 0.3, the weight of the eye width to face width is 0.15, the weight of the jaw width to face height is 0.2, the weight of the chin width to face height is 0.2 and the weight of the distance between the eyes to face width is 0.15 in calculating the weighted average of the five components.

The disclosed embodiments may individually and/or collectively be components of a larger system, wherein other procedures may take precedence over or otherwise modify their application. Also, a number of steps may be required before, after, and/or concurrently with the following embodiments.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure can be written in any combination of one or more programming languages. The program code may execute entirely on the user's computer, as a stand-alone software package, partly on the user's computing device and partly on a remote computing device or entirely on the remote computing device. In the latter scenario, the remote computing device may be connected to the user's computing device through any type of network, including a local area network (LAN) or a wide area network (WAN), or the connection may be made to an external computing device (for example, through the Internet using an Internet Service Provider).

The computing device for carrying out operations for aspects of the present disclosure can be, but is not limited to, a mainframe computer, a server, a desktop computer, a laptop computer, a tablet computer, a smart phone or a handheld digital device.

Aspects of the present disclosure are described below with reference to flowchart illustrations and/or block diagrams of methods, systems and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

While the preferred embodiment to the disclosure had been described, those skilled in the art, both now and in the future, may make various improvements and/or enhancements which fall within the scope of the claims which follow. These claims should be construed to maintain the proper protection for the disclosure first described.

In conclusion, herein is presented a method and a system for a dating website using face matching technology that matches a first user to a second user having similar facial features to electronically introduce the users for establishing a dating relationship. The disclosure is illustrated by example in the drawing figures, and throughout the written description. It should be understood that numerous variations are possible, while adhering to the inventive concept. Such variations are contemplated as being a part of the present disclosure.

What is claimed is:

1. A method comprising:
via a computer system having a server with a processor:
storing in a database, the database operative on a server of a computer system, said database storing a plurality of profiles, each profile associated with a user, each profile linked to a facial image of said user, said profile and said facial image received from said user via said computer system;
calculating a digital face map for each user using the facial image linked with said profile of said user, the calculations performed by a software application executed by a processor on the server, said face map a binary image for each facial image stored in the database, said binary image processed by an edge detector;
calculating a Hausdorff distance between the digital face map of a first user and the digital face map of an other user, the calculations executed by the processor on the server, the processor continuing the calculations until the Hausdorff distance between the digital face map of said first user and the digital face map of each other user having a profile in the database are complete and stored on the server;
ranking the calculated Hausdorff distances by the processor, the smallest Hausdorff distance ranking highest, the processor retrieving from the database the facial image associated with the smallest Hausdorff distance;
presenting for display by the server, the facial image associated with the smallest Hausdorff distance, said facial image having a hyperlink to the associated profile, said server presenting for display said associated profile based on detecting an activation of said hyperlink by said first user, said profile stored in the server of the computer system, said first user accessing said system;
wherein the step of calculating a digital face map for each user using the facial image linked with said profile of said user includes normalizing and aligning the facial image onto a template, creating a set of points representing a shape of the facial image; wherein said template is an outline of a face; and wherein said outline is represented by an estimated fractal dimension.

2. The method as described in claim 1, wherein said fractal dimension is mapped in an underlying metric space represented by a set containing a series of coordinates.

3. A method comprising:
via a computer system having a server with a processor:
storing in a database, the database operative on a server of a computer system, said database storing a plurality of profiles, each profile associated with a user, each profile linked to a facial image of said user, said profile and said facial image received from said user via said computer system;

calculating a digital face map for each user using the facial image linked with said profile of said user, the calculations performed by a software application executed by a processor on the server, said face map a binary image for each facial image stored in the database, said binary image processed by an edge detector;

calculating a Hausdorff distance between the digital face map of a first user and the digital face map of an other user, the calculations executed by the processor on the server, the processor continuing the calculations until the Hausdorff distance between the digital face map of said first user and the digital face map of each other user having a profile in the database are complete and stored on the server;

ranking the calculated Hausdorff distances by the processor, the smallest Hausdorff distance ranking highest, the processor retrieving from the database the facial image associated with the smallest Hausdorff distance; and presenting for display by the server, the facial image associated with the smallest Hausdorff distance, said facial image having a hyperlink to the associated profile, said server presenting for display said associated profile based on detecting an activation of said hyperlink by said first user, said profile stored in the server of the computer system, said first user accessing said system, wherein the step of calculating a Hausdorff distance between the digital face map of a first user and the digital face map of an other user, said digital face map having a pair of said outlines of said facial images, said outlines represented by sets containing a series of coordinates, a first set represented by X, a second set represented by Y, includes calculating said Hausdorff distance for the two sets X and Y with the following equation:

$$d(X,Y) = \sup\{d(x,Y) | x \in X\}.$$

4. A non-transitory computer-readable storage medium having a plurality of computer-readable instructions stored thereon which computer-executably implement a method, comprising:

storing in a database, the database operative on a server of a computer system, said database storing a plurality of profiles, each profile associated with a user, each profile linked to a facial image of said user, said profile and said facial image received from said user via said computer system;

calculating a digital face map for each user using the facial image linked with said profile of said user, the calculations performed by a software application executed by a processor on the server, said face map a binary image for each facial image stored in the database, said binary image processed by an edge detector;

calculating a Hausdorff distance between the digital face map of a first user and the digital face map of an other user, the calculations executed by the processor on the server, the processor continuing the calculations until the Hausdorff distance between the digital face map of a first user and the digital face map of each other user having a profile in the database are complete and stored on the server;

ranking the calculated Hausdorff distances by the processor, the smallest Hausdorff distance ranking highest, the processor retrieving from the database the facial image associated with the smallest Hausdorff distance; and presenting for display by the server, the facial image associated with the smallest Hausdorff distance, said facial image having a hyperlink to the associated profile, said server presenting for display said associated profile based on detecting an activation of said hyperlink by said first user, said profile stored in the server of the computer system, said first user accessing said system;

wherein said medium implements said method further comprising the step of calculating a digital face map for each user using the facial image linked with said profile of said user, said step includes normalizing and aligning the facial onto a template, creating a set of points representing a shape of the facial image; wherein said medium implements said method further comprising said template, said template an outline of a face; and wherein said medium implements said method further comprising representing said outline by an estimated fractal dimension.

5. The medium as described in claim 4, wherein said medium implements said method, said method further comprises mapping said fractal dimension in an underlying metric space represented by a set containing a series of coordinates.

6. The medium as described in claim 5, wherein said medium implements said method, said method further comprises the step of calculating a Hausdorff distance between the digital face map of a first user and the digital face map of an other user, said digital face map having a pair of said outlines of said facial images, said outlines represented by sets containing a series of coordinates, a first set represented by X, a second set represented by Y, comprises calculating said Hausdorff distance for the two sets X and Y with the following equation:

$$d(X,Y) = \sup\{d(x,Y) | x \in X\}.$$

* * * * *